UNITED STATES PATENT OFFICE.

CARL B. DOLGE, OF WESTPORT, CONNECTICUT.

CONCENTRATED EMBALMING LIQUID.

No. 892,654.

Specification of Letters Patent.

Patented July 7, 1908.

Application filed June 9, 1906. Serial No. 320,992.

*To all whom it may concern:*

Be it known that I, CARL B. DOLGE, a citizen of the United States, and resident of Westport, in the county of Fairfield and State of Connecticut, have invented certain new and useful Improvements in Concentrated Embalming Liquid, of which the following is a specification.

My invention, is of a new composition for embalming purposes, for use by undertakers in preserving dead bodies.

It is the object of my invention, to produce a fluid essence or concentrated liquid, for the above purpose, which in many respects will be more convenient to ship, handle and use, than the bulk fluids now upon the market; to provide a fluid which can be put up for the trade in small packages, and is adapted to be diluted with water for use, thereby producing many times the original quantity of fluid, and to further produce a more effective disinfectant and preservative, having greater cosmetic properties, which will be equally or more efficient than any of the bulk fluids now upon the market.

With the above and other minor objects in view my invention resides and consists in the selection and compounding of certain well known ingredients as will be later more fully explained and then recited in the claims.

The majority of embalming fluids now upon the market are put out in liquid form, and usually in not smaller than half gallon bottles, one half to one gallon is about the average amount used in embalming the ordinary body, this amount however, necessarily varies materially owing to the varying condition and size of the different cases.

The usual method of using the embalming fluids now upon the market is to run it into the arteries and veins after the blood and gases have been extracted. It will therefore be apparent that to preserve bodies in this way a considerable amount or bulk of material is necessary and it must also contain the necessary qualities to produce a proper disinfectant, preservative, bleacher, etc., as is required in the art. The fluid must also be sufficiently thin to insure its free and proper distribution throughout the several cavities of the body.

The old form of embalming fluids were objectionable owing to the inconvenience and expense of putting up and handling them in their bulky packages and consequently the trade has long since been in need of a concentrated embalming preparation that could be put up in small original packages, and be mixed with a greater quantity of water just prior to use. Such a condensed preparation according to my knowledge is most desirable when produced in a liquid form, as it can more readily be taken from its receptacle and likewise is more easily mixed with the water, besides possessing other minor advantages. I therefore elect to produce my new compound in the form of liquid and put it in small bottles, holding say about twelve ounces and capable of making a half of a gallon of fluid by adding the necessary amount of water to it.

Some of the chemicals employed are solids, while others are liquids, but a greater proportion of the liquids are used therefore. The solids are dissolved in the solution which will readily further dissolve and mix when water is added to it.

After several years of experimenting with various ingredients with a view of producing a desirable concentrated fluid, I have selected and compounded the following named chemicals and in substantially the proportions named: guaiacol, 120 parts, commercial formaldehyde 3,000 and saltpeter 960 parts. By commercial formaldehyde is meant the 40% solution of formaldehyde commonly sold under the name of "formaldehyde". The foregoing ingredients form a concentrated liquid solution containing a part of the chemicals undissolved, but which readily dissolve further when mixed with the necessary amount of water.

In preparing the concentrated solution the liquids are mixed first, then the saltpeter is put into the bottle or receptacle in which it is to be sold; the right proportion of the concentrated liquid mixture is added to the saltpeter and the bottle or receptacle is then closed with a cork and sealed to render it airtight.

The guaiacol and formaldehyde when combined and mixed with water will make an antiseptic solution of sufficient strength to embalm and preserve human bodies.

Having thus described my invention, what I claim and desire to secure by Letters-Patent is:—

1. A concentrated liquid for use in embalming, containing guaiacol, saltpeter and commercial formaldehyde.

2. A concentrated liquid for use in embalming containing guaiacol 120 parts, commercial formaldehyde, 3,000 and saltpeter 960 parts.

Signed at Bridgeport in the county of Fairfield and State of Connecticut this 7th day of June A. D., 1906.

CARL B. DOLGE.

Witnesses:
C. M. NEWMAN,
RUTH RAYMOND.